US009079558B2

(12) United States Patent
Crouch

(10) Patent No.: US 9,079,558 B2
(45) Date of Patent: Jul. 14, 2015

(54) COATED AIRBAG

(75) Inventor: Earl Crouch, Greensboro, NC (US)

(73) Assignee: GLOBAL SAFETY TEXTILES, LLC, Greensboro, NC (US)

( * ) Notice: Subject to any disclaimer, the term of this patent is extended or adjusted under 35 U.S.C. 154(b) by 1096 days.

(21) Appl. No.: 12/687,532

(22) Filed: Jan. 14, 2010

(65) Prior Publication Data

US 2010/0181744 A1 Jul. 22, 2010

Related U.S. Application Data

(60) Provisional application No. 61/145,202, filed on Jan. 16, 2009.

(51) Int. Cl.
*B60R 21/16* (2006.01)
*B60R 21/235* (2006.01)

(52) U.S. Cl.
CPC ..... *B60R 21/235* (2013.01); *B60R 2021/23514* (2013.01); *B60R 2021/23547* (2013.01); *Y10T 156/1043* (2015.01)

(58) Field of Classification Search
USPC ......................................... 428/36.2; 427/314
See application file for complete search history.

(56) References Cited

U.S. PATENT DOCUMENTS

| | | | |
|---|---|---|---|
| 4,440,196 A | 4/1984 | Arvai | |
| 4,977,016 A | 12/1990 | Thornton et al. | |
| 5,098,125 A * | 3/1992 | Thornton et al. | 280/743.1 |
| 5,336,538 A | 8/1994 | Kitamura | |
| 5,538,280 A | 7/1996 | Gray et al. | |
| 5,650,207 A | 7/1997 | Crouch | |
| 5,685,347 A | 11/1997 | Graham et al. | |
| 5,707,711 A | 1/1998 | Kitamura | |
| 5,763,330 A * | 6/1998 | Bertolucci et al. | 442/65 |
| 5,881,776 A | 3/1999 | Beasley, Jr. | |
| 5,928,721 A | 7/1999 | Parker et al. | |
| 5,945,186 A | 8/1999 | Li et al. | |
| 6,169,043 B1 | 1/2001 | Li | |
| 6,177,365 B1 | 1/2001 | Li | |
| 6,177,366 B1 | 1/2001 | Li | |
| 6,291,048 B1 | 9/2001 | Jerdee et al. | |
| 6,294,487 B1 | 9/2001 | Keshavaraj | |
| 6,344,251 B1 | 2/2002 | Keshavaraj et al. | |
| 6,348,543 B1 | 2/2002 | Parker | |
| 6,399,155 B2 | 6/2002 | Child et al. | |
| 6,402,187 B1 | 6/2002 | Gilpatrick et al. | |
| 6,444,594 B1 | 9/2002 | Child et al. | |

(Continued)

FOREIGN PATENT DOCUMENTS

| | | |
|---|---|---|
| DE | 19852232 | 5/2000 |
| EP | 0 669 419 | 2/1995 |

(Continued)

OTHER PUBLICATIONS

Estane® 58300Technical Data Sheet (2007) Lubrizol Corporation.

(Continued)

*Primary Examiner* — Nathan T Leong
(74) *Attorney, Agent, or Firm* — Pearne & Gordon LLP

(57) ABSTRACT

A coated airbag is provided. In another aspect, a method of extrusion coating an air impermeable material onto a one-piece woven airbag fabric is employed. Another aspect preheats a fabric such that the fabric remains hot during a coating application thereon. Furthermore, a machine for making and coating an airbag fabric is also provided.

26 Claims, 4 Drawing Sheets

(56) References Cited

U.S. PATENT DOCUMENTS

| | | |
|---|---|---|
| 6,451,715 B2 | 9/2002 | Li et al. |
| 6,458,412 B2 | 10/2002 | Child et al. |
| 6,467,806 B2 | 10/2002 | Gilpatrick et al. |
| 6,468,929 B2 | 10/2002 | Parker |
| 6,545,092 B2 | 4/2003 | Parker |
| 6,569,788 B1 | 5/2003 | Hurst et al. |
| 6,576,574 B2 | 6/2003 | Child et al. |
| 6,632,753 B1 | 10/2003 | Beasley, Jr. |
| 6,672,617 B1 | 1/2004 | Gilpatrick et al. |
| 6,673,728 B1 | 1/2004 | Newbill |
| 6,713,131 B2 | 3/2004 | Blackwood et al. |
| 6,734,124 B2 | 5/2004 | Hurst et al. |
| 6,753,275 B2 | 6/2004 | Veiga |
| 6,830,261 B2 | 12/2004 | Sollars, Jr. |
| 6,846,004 B2 | 1/2005 | Parker |
| 6,945,282 B2 | 9/2005 | Gendelman et al. |
| 7,013,681 B1 | 3/2006 | Ternon et al. |
| 7,132,170 B2 | 11/2006 | Parker |
| 7,179,762 B1 | 2/2007 | Beasley, Jr. |
| 7,235,293 B2 | 6/2007 | Daily et al. |
| 7,287,478 B2 | 10/2007 | Keshavaraj et al. |
| 7,341,769 B2 | 3/2008 | Barnes |
| 7,351,465 B2 | 4/2008 | Jerdee et al. |
| 7,353,669 B2 | 4/2008 | Ternon et al. |
| 7,375,042 B2 | 5/2008 | Schmitt et al. |
| 7,407,898 B2 | 8/2008 | Parker |
| 7,413,214 B2 | 8/2008 | Keshavaraj et al. |
| 7,498,280 B2 | 3/2009 | DeBenedictis et al. |
| 7,501,359 B2 | 3/2009 | Li |
| 7,517,570 B1 | 4/2009 | Li et al. |
| 7,543,843 B2 | 6/2009 | Keshavaraj et al. |
| 7,549,669 B2 | 6/2009 | Keshavaraj |
| 2001/0049243 A1 | 12/2001 | Crouch et al. |
| 2002/0060449 A1 | 5/2002 | Keshavaraj |
| 2002/0122908 A1* | 9/2002 | Li et al. .................. 428/36.2 |
| 2002/0140218 A1 | 10/2002 | Beasley, Jr. |
| 2002/0195808 A1 | 12/2002 | Chiou et al. |
| 2005/0161919 A1 | 7/2005 | Berger et al. |
| 2006/0151882 A1 | 7/2006 | Trondle et al. |
| 2008/0085942 A1 | 4/2008 | Jackson et al. |
| 2008/0274365 A1* | 11/2008 | Urscheler .................. 428/537.5 |

FOREIGN PATENT DOCUMENTS

| | | |
|---|---|---|
| GB | 940704 | 10/1963 |
| JP | H06-305089 | 11/1994 |
| WO | WO 02/18180 A2 | 3/2002 |
| WO | WO 02/070252 | 9/2002 |
| WO | WO 2007/070465 | 6/2007 |

OTHER PUBLICATIONS

Estane® 58315 Technical Data Sheet (2007) Lubrizol Corporation.
DuPont Bynel® adhesive resins: Product Technical Data (2008).
DuPont Entira™ Coat resins Product Data Sheet (2007).
Karlow, James P. et al. "Development of New, Downsized Airbag Modules for Frontal and Side Impacts," Automotive Body Interior & Safety Systems—IBEC (1994); pp. 66-72.
Crouch, Earl T., "Evolution of Airbag Components and Materials," SAE; 932912; Worldwide Passenger Car Conference and Exposition, Dearborn, Michigan, Oct. 25-27, 1993; pp. 1-10.

* cited by examiner

COATED AIRBAG

CROSS-REFERENCE TO RELATED APPLICATIONS

This application claims the benefit of U.S. Provisional Application No. 61/145,202, filed on Jan. 16, 2009, which is incorporated by reference herein.

BACKGROUND

The present application pertains generally to coated fabrics and more particularly to coated airbags for automotive vehicles.

Simple cut and sew airbags have been commonly used for front and side passenger protection in automotive vehicles. Many modern side curtain airbags, however, must protect the passengers during a vehicular rollover situation and thereby must retain the inflation gas within the airbag for an elongated period of time. Traditional cut and sew airbags have a relatively simple to manufacture fabric construction but often require expensive coatings applied in a relatively complex manner in order to overcome undesired inflation gas leakage through the sewn seams when used for side rollover airbags. Examples of such traditional coated, cut and sew airbags can be found in U.S. Patent Publication No. 2001/0049243 entitled "Lightweight, High Strength Coated Fabric" invented by Crouch et al., and PCT Patent Publication No. WO 2007/070465 entitled "Thermoplastic Coated, Heat-Sealed Airbag" listing Sescourka et al. as inventors. Both of these patent publications are incorporated by reference herein.

One-piece woven ("OPW") airbags have also been employed for side curtain airbags. Examples of such OPW airbags can be found in the following U.S. patents and patent publications: U.S. Pat. No. 5,685,347 entitled "Circular Air Bag Made of Two Simultaneously Woven Fabric" which issued to Graham et al. on Nov. 11, 1997; 2005/0161919 entitled "Airbag and Method of Producing an Airbag" invented by Berger et al.; and 2002/0140218 entitled "One-Piece Woven Airbag" invented by Beasley, Jr. These patents and publications are all incorporated by reference herein. A knife-over-roll coating process has been used for some conventional OPW airbags, however, this undesirably allows for considerable thickness variations in the coating and can be a costly process. Furthermore, some conventional OPW airbags have used a laminated film approach as an alternative to the knife-over-roll coating process, but this tends to be undesirably expensive and creates difficult to fold stiffness in the final airbag. It is noteworthy, however, that U.S. Pat. No. 7,179,762 entitled "Motor Vehicle Air Bag and Fabric for Use in Same," invented by Beasley, Jr., states at the top of column 2 that "it is relatively difficult to coat a one-piece curtain" airbag as compared to simpler cut and sew fabric constructions.

SUMMARY

In accordance with the present invention, a coated airbag is provided. In another aspect, a method of extrusion coating an air impermeable material onto a one-piece woven airbag fabric is employed. Another aspect preheats a fabric such that the fabric remains hot during a coating application thereon. Furthermore, a machine for making and coating an airbag fabric is also provided. In yet another aspect, a vehicular airbag has a one-piece woven construction with an outer coating of high molecular weight, thermoplastic material.

The present coated airbag, machine and methods are advantageous over traditional constructions, machines and processes, since the present airbag employs considerably less expensive coating materials while achieving superior performance. The materials employed for the present coating (and entire airbag) are also recyclable, thereby reducing scrap costs, and the coating is easily applied in a uniformly thick manner that is independent of fabric weaving variations. Additionally, lighter weight coating materials are used in the present system, especially as compared to more expensive silicone materials, but without sacrificing performance. This also allows for a reduced packaging size for the final airbag in the vehicle. Additional advantages and features of the present invention will become apparent from the following description and appended claims, taken in conjunction with the accompanying drawings.

DETAILED DESCRIPTION OF THE PREFERRED EMBODIMENT

Figure 1:
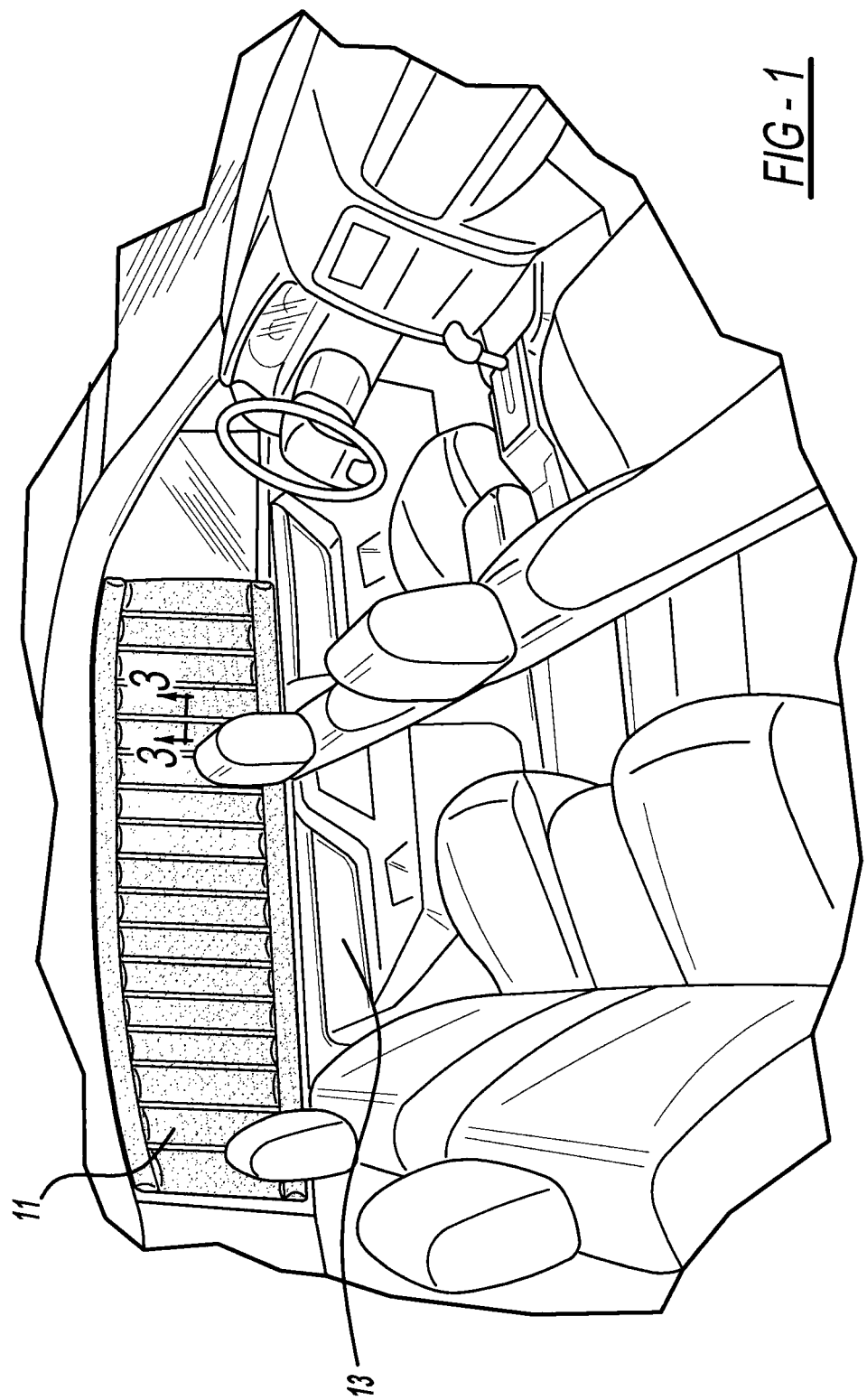
FIG. 1 is a perspective view showing a coated airbag, in an inflated condition, employed in an automotive vehicle.
Figure 3:
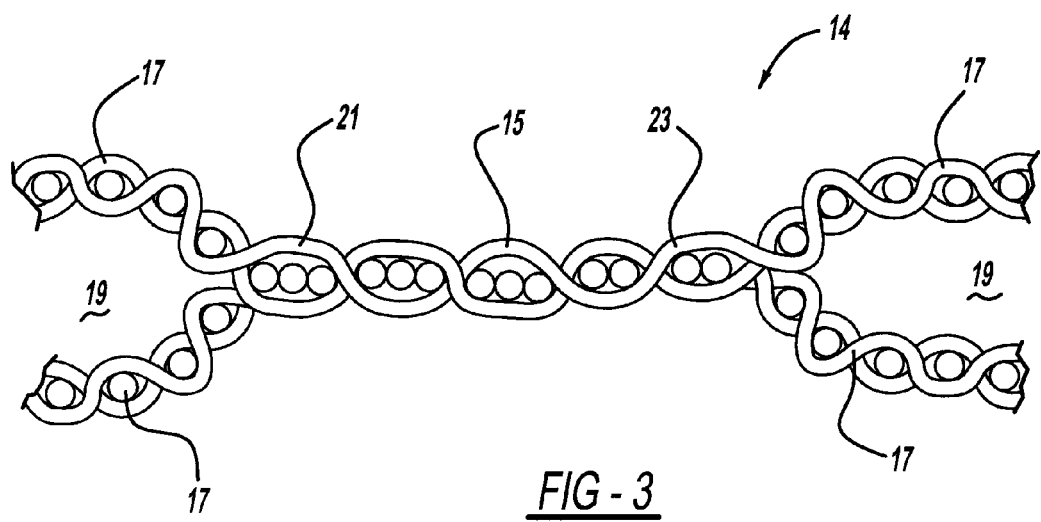
FIG. 3 is a diagrammatic cross-sectional view, taken along line 3-3 of FIG. 1, showing an exemplary one-piece woven fabric, prior to coating.
Figure 5:
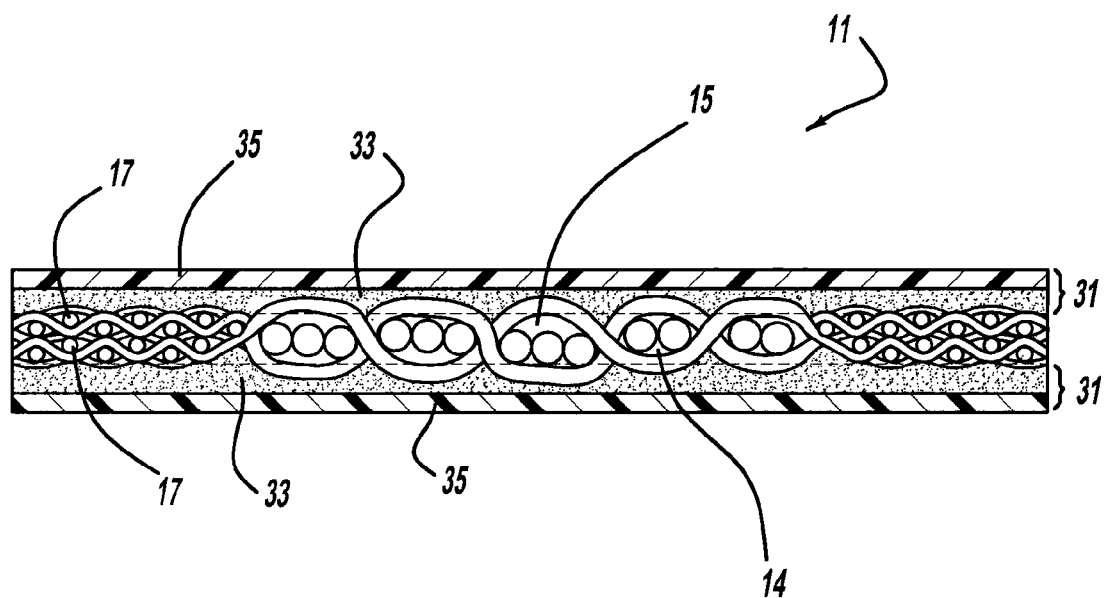
FIG. 5 is a diagrammatic cross-sectional view of the airbag, after coating.

FIGS. 1, 3 and 5 show an exemplary airbag 11 employed in an automotive vehicle 13. Preferably, this airbag is of a side curtain airbag variety which is suitable for retaining a majority of its inflation gas for at least five seconds from full inflation, to meet suitable vehicular rollover requirements. More particularly, airbag 11 includes a one-piece woven fabric 14, having a single layer seam 15 integrally woven to multiple fabric layers 17 surrounding a gas inflation chamber 19 therebetween. In the exemplary embodiment, both 3×3 woven baskets 21 and 2×2 woven baskets 23 are employed in the single layer seam 15 between the pair of double layer inflation chambers 19.

The OPW fabric fibers are preferably made of nylon 6/6, although it is alternately envisioned that a high tenacity polyester material can be employed. OPW fabric 14 is woven on a programmable jacquard loom 25 (see FIG. 4). Exemplary jacquard looms are disclosed in U.S. Pat. No. 4,440,196 entitled "Double Open-Shed Jacquard Machine for the Lifting of Warp Yarns of a Loom" which issued to Arvai on Apr. 3, 1984, and U.S. Pat. No. 6,945,282 entitled "Method and Device for Forming a Shed in a Weaving Machine" which issued to Gendelman et al. on Sep. 20, 2005; both of which are incorporated by reference herein.

Figure 4:
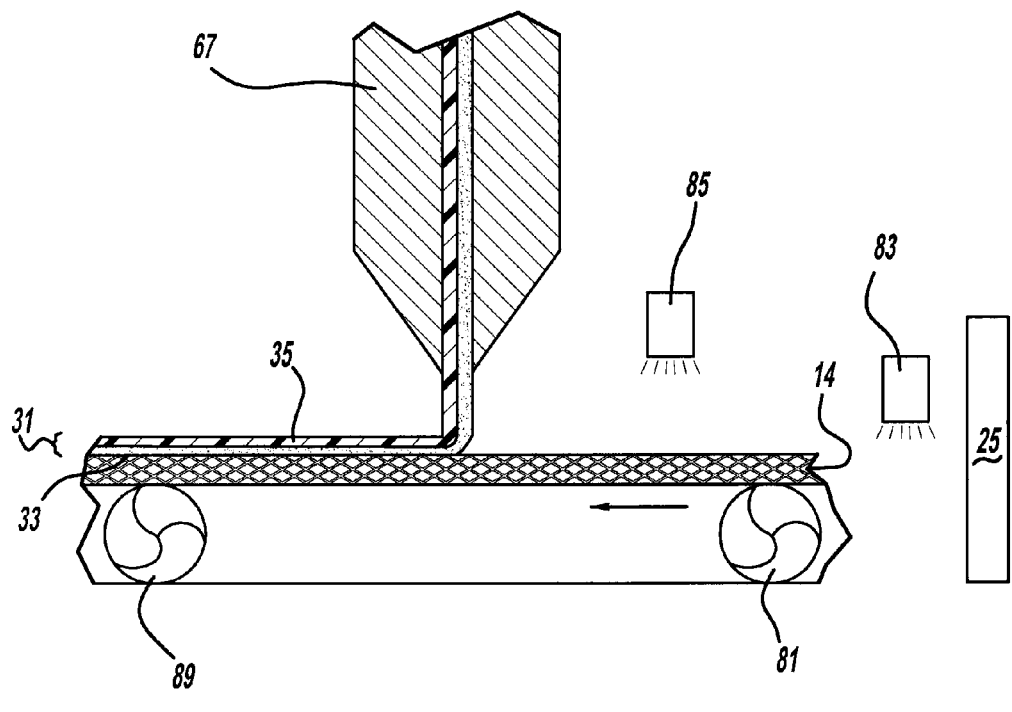
FIG. 4 is a diagrammatic side view showing the equipment used to make the coated airbag.

Referring to FIGS. 4 and 5, a coating 31 is located on each outside surface of the fabric portion of airbag 11. Coating 31 includes an inner adhesive material 33, penetrating into and bonded with the fabric fibers, and an outer air impermeable and leak-resistant material 35 bonded to adhesive material 33. Adhesive material 33 is preferably a thermoplastic material such as an ethylene copolymer, exhibiting a molecular weight range that is suitable for molten extrusion. One such adhesive material is the Entira™ Coat 100 material which can be obtained from E.I. du Pont de Nemours and Company, Inc.

The preferred air impermeable material is a thermoplastic polyurethane ("TPU") polymer which has a molecular weight within a range of 100,000-200,000. The ultimate elongation percentage of the preferred air impermeable polymeric material is greater than 300, and more preferably within the range of 500-700. Furthermore, the preferred tensile strength for the air impermeable material is within the range of 30-50 MPa. Suitable air impermeable polymeric materials can be obtained from Lubrizol Advanced Materials, Inc. as Estane® 58300 and 58315 materials. The phrase "air impermeable" indicates that the material resists flow of the inflation gas therethrough after final solidification of the coating materials, however, it does not require absolute impermeability. The air impermeable polymeric material and the adhesive material are preferably neither water-based nor solvent-based given their desired high molecular weights. Solubility of such materials is negligible and the materials are formed into a film type of coating by melting the materials and working with them as a liquid in an approximately 100 percent solids molten condition.

Figure 2:
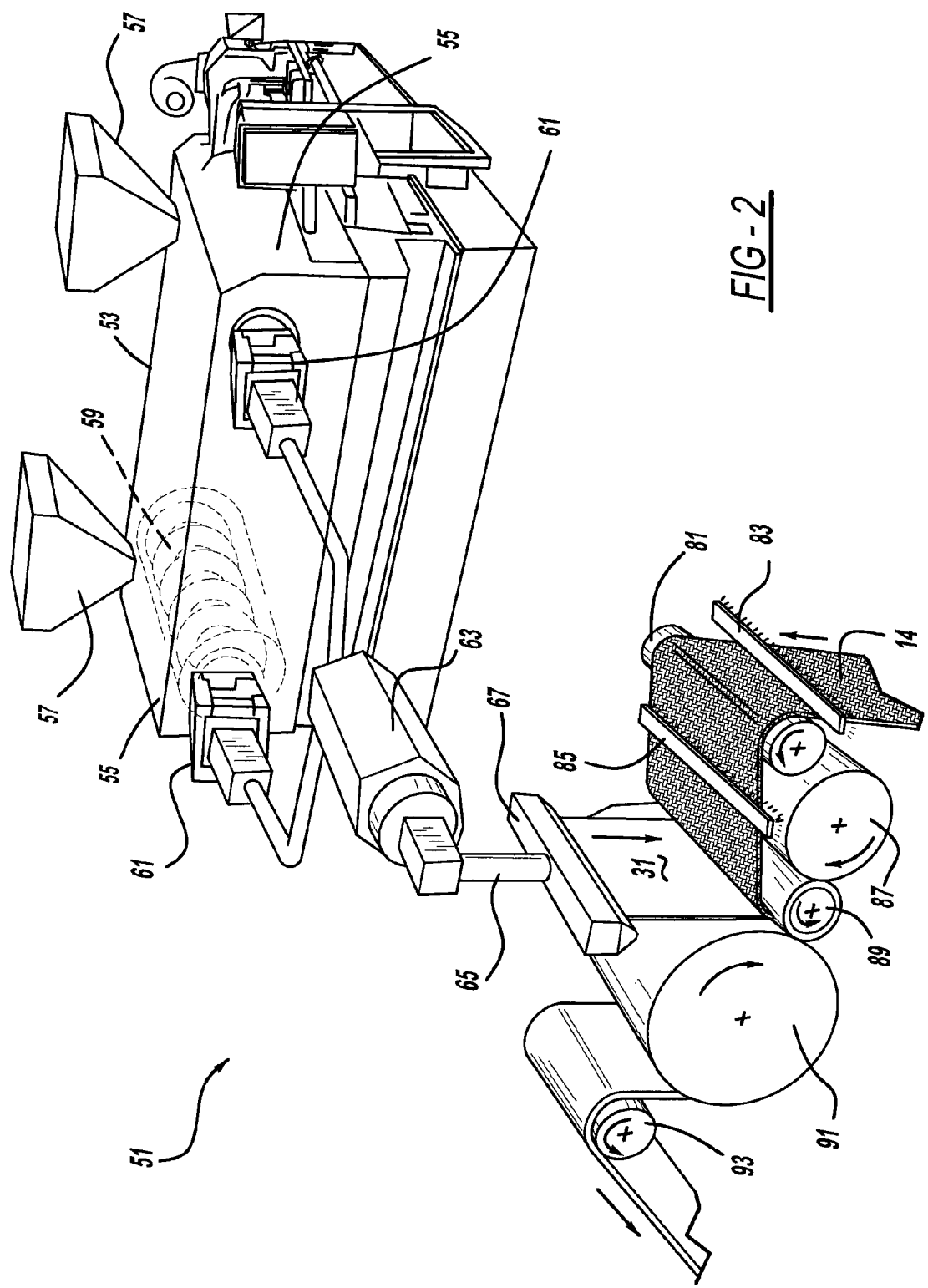
FIG. 2 is a diagrammatic perspective view showing the equipment used to make the coated airbag.

FIGS. 2-4 show a machine 51 used to make coated airbag 11. Machine 51 includes a coextruder 53 which has two extruder sections 55 with corresponding feed hoppers 57. Rotating screws 59 are located within each heated barrel 61. A pair of pipes or a manifold connects tips of both extruder barrels 61 to a combining block 63. Another pipe 65 or suitable conduit connects an end of combining block 63 to an elongated die 67. Die 67 has a laterally elongated exit slot downwardly facing toward fabric 14.

Fabric 14 is woven on jacquard loom 25 and then it is rolled up and transported to the coating line. It is then unrolled as it is fed into machine 51. Fabric 14 initially contacts against a lead-in roll 81. A pair of infrared heaters 83 and 85 preheat the adjacent outer surface of fabric 14 to a fabric temperature within the range of 100-180° C., and more preferably at about 150° C. The preheating advantageously delays solidification of the coating in order to allow deeper fabric penetration. Moreover, infrared heaters are ideally suited to allow tight packaging in their placement near coating die 67.

The hot fabric is then coated with the adhesive and air impermeable materials in a curtain-type coating 31 essentially along the full width of the fabric. The outer surface of fabric 14 is still hot, at a temperature of at least 100° C., where coating 31 is applied onto the fabric's outer surface, as this preheating will significantly improve adhesion and coverage of the coating. A dwell time between the fabric preheating step and the coating application is 10 seconds or less, and preferably 5 seconds or less, given the disclosed fabric travel speeds in the coating machine. Thus, downstream infrared heater 85 is 3 meters or less from coating die 67, and more preferably 1.5 meters or less, for 0.3 meters per second fabric speed. For faster fabric speeds, however, the heater to die distance can be greater (but with the same dwell time) as long as the fabric is sufficiently hot when the coating is applied.

Coating 31 is applied in a generally uniform thickness by die 67 onto fabric 14, exiting die 67 at about 20 thousandths of an inch thick while still molten. After contacting the surface of fabric 14 and subsequent solidification, the coating preferably has a total thickness within the range of about 1-6 thousandths of an inch and more preferably at about 2 thousandths of an inch, approximately half of which is the adhesive and half of which is the air impermeable material. The final solidified coverage of coating 31 onto fabric 14 is preferably within the range of 30-90 grams per square meter and more preferably at approximately 50 grams per square meter. The thermoplastic material is applied to the fabric at a temperature within the range of about 200-250° C. and preferably within the range of 204-216° C. Furthermore, fabric 14 is moving through machine 51 at about 0.3-1.6 meters per second and preferably 1 meter per second. Coating 31, however, is being extruded from die 67 onto fabric 14 at a slower speed, at approximately a 10:1 ratio of fabric-to-coating speed, therefore the fabric draws the coating in a thinning manner as it is being applied. Moreover, coating 31 is applied on the fabric such that the adhesive and air permeable materials preferably remain in two generally distinct layers, but with penetration of at least the adhesive into the outer fabric material.

A steel backing roll 87 controls the temperature of a contacting rubber covered roll 89. Fabric 14 is then pulled between rubber roll 89 and an adjacent chill roll 91. Chill roll 91 includes a set of closed loop, recirculating air/liquid cooling lines therein. Coating 31 remains molten when it and the fabric 14 are compressed between rolls 89 and 91. The elastomeric and cushioned rubber surface of roll 89 is compressible enough to absorb the thickness variations of the OPW weaving pattern of fabric 14 while maintaining the uniformity of the coating thickness against chill roll 91. Thus, this process is different than traditional calendaring. In other words, this combining station includes rubber roll 89 pressing against the backside of fabric 14 and the relatively large diameter steel, chill roll 91 that presses the molten coating 31 into the other fabric surface and cools the coating to solidify it. The two rolls are independently temperature controlled. Additionally, chill roll 91 imparts the mirror image of its own surface finish or texture into the coating surface (i.e., embossing) before the coating layers are cooled enough to be removed from the cooling roll surface.

Thereafter, the coated fabric moves around a stripper roll 93. The resulting one-side coated fabric is rolled up and then fed back into the beginning of machine 51 in an inverted manner, such that the opposite outside surface is upwardly facing for subsequent preheating, coating and solidification. The fully coated fabric is subsequently moved to a cutting station where each individual airbag is laser cut therefrom.

In greater detail, the process flow for the coextrusion coated fabric of the present application is performed in two simultaneous flows: one for the coating material and one for the fabric itself. The process flow of the coating material is further described as follows:

1. Plastic pellets of air impermeable TPU material 35 and adhesive material 33 are pneumatically conveyed from shipping containers to their respective feed hoppers 57 mounted above a back of extruders 55.
2. Pellets are fed into the first flight of rotating screws 59 of extruders 55 which are tightly fitted in the heated steel barrels 61.
3. The pellets are melted, deaerated and brought to a high pressure by a progressive change in the pitch and depth of the extruder flights of screws 59.
4. The resulting molten flow exits the tips of the extruders 55 at a rate that is precisely controlled by the speed of the rotating extruder screws 59.
5. The above process is carried out simultaneously in two extruders; one for adhesive layer 33 of coating 31 and one for the outer exposed, air impermeable TPU layer 35 of the coating.
6. The flow from the two extruders 55 is fed to combining block 63 and then into extrusion die 67 that shapes the molten flow into a wide, thin 2-layer curtain with the adhesive material on one side of the curtain and the topcoat, air impermeable material on the other side of the curtain.

7. Extrusion die 67 and its curtain of extrudate are positioned immediately above the path of moving fabric 14 to allow the application of a film of plastic coating 31 on the upward facing surface of the moving fabric.

The previously disclosed example is employed for a side curtain airbag having an OPW fabric construction. Nevertheless, various features from the present application may be used with front or seat mounted airbags, cut and sew airbags, or even seat belt webbing, although many advantages of the present application may not be realized. Furthermore, it is alternately envisioned that the adhesive and air impermeable materials can be applied in a series rather than previously disclosed parallel manner by separate and spaced apart extrusion machines and dies, however, various advantages of the present application may not be achieved. Moreover, other heaters beyond infrared heaters, may alternately be employed, however, other heaters may be larger and have inferior performance. Additionally, certain aspects of the present application may be used without an adhesive layer if a suitable air impermeable material is otherwise used. While various materials, weaving patterns and exemplary characteristics have been disclosed, it should be appreciated that various other materials, patterns and characteristics can be employed. It is intended by the following claims to cover these and any other departures from the disclosed embodiments which fall within the true spirit of this invention.

The invention claimed is:

1. A method for making a one-piece woven airbag, the method comprising:
    (a) creating a one-piece woven fabric, the created fabric comprising a single fabric layer seam and a multiple fabric layer inflation chamber, the single fabric layer seam comprising odd-numbered woven baskets and even-numbered woven baskets;
    (b) feeding the created fabric into a coating machine;
    (c) preheating an initial outer surface of the fed fabric in the coating machine;
    (d) extruding a polymeric material using the coating machine;
    (e) coating the extruded polymeric material upon the preheated initial outer surface using the coating machine, the coated polymeric material being configured to operably reduce air permeability through the fabric if the inflation chamber is inflated, the preheated initial outer surface remaining hot during the coating, an entirety of a thickness of the coated polymeric material after solidification on the initial outer surface of the fabric being within the range of 1-6 thousandths of an inch and having a coverage area within the range of about 30-90 grams per square meter;
    (f) compressing the fabric in the coating machine such that the coated polymeric material on the initial outer surface is substantially solidified;
    (g) inverting the fabric coated on the initial outer surface such that an outer surface of the fabric that is opposite the coated initial outer surface is upwardly facing;
    (h) feeding the inverted fabric into the coating machine;
    (i) preheating the opposite outer surface of the fed inverted fabric in the coating machine; and
    (j) coating the extruded polymeric material upon the preheated opposite outer surface of the inverted fabric using the coating machine,
    wherein the coating of the extruded polymeric material upon the preheated initial outer surface and upon the preheated opposite outer surface comprises varying an amount of the extruded polymeric material such that a surface of the coated polymeric material is flat and independent of thickness variations of the created fabric.

2. The method of claim 1, wherein the compressing of the fabric comprises cooling the coated polymeric material on the fabric.

3. The method of claim 1, wherein the odd-numbered woven baskets are defined by 3×3 woven baskets, and
    wherein the even-numbered woven baskets are defined by 2×2 woven baskets.

4. The method of claim 1, wherein the one-piece woven fabric is made of nylon 6/6.

5. The method of claim 1, wherein the one-piece woven fabric is made of polyester.

6. The method of claim 1, wherein the one-piece woven fabric is woven on a programmable jacquard loom.

7. The method of claim 1, wherein the coating machine comprises a coextruder having two or more extruder sections with corresponding feed hoppers, rotating screws located within heated barrels that correspond with the extruder sections, a combining block connected to the barrels, and an elongated die connected to the combining block, and
    wherein the die has a laterally elongated exit slot downwardly facing toward the one-piece woven fabric during the coating.

8. The method of claim 1, further comprising rolling up the one-piece woven fabric after the creation of the one-piece woven fabric,
    wherein the one-piece woven fabric is unrolled during the feeding of the created fabric into the coating machine.

9. The method of claim 1, wherein the one-piece woven fabric contacts against a lead-in roll after being fed into the coating machine and before being preheated.

10. The method of claim 1, wherein the one-piece woven fabric moves through the coating machine at a speed with a range of about 0.3 msec-1.6 msec.

11. The method of claim 1, wherein the compressing of the fabric comprises pressing against a backside of the one-piece woven fabric and a steel chill roll with a rubber roll.

12. The method of claim 1, wherein the coating of the extruded polymeric material is a curtain-type coating that is performed essentially along a full width of the one-piece woven fabric.

13. The method of claim 1, wherein a dwell time between the preheating of the initial outer surface to the coating of the material upon the preheated initial outer surface is 10 seconds or less.

14. The method of claim 1, wherein the coated polymeric material is thermoplastic.

15. The method of claim 14, wherein the thermoplastic material is applied to the one-piece woven fabric at a temperature within a range of about 200° C.-250° C.

16. The method of claim 1, wherein the coated polymeric material comprises an inner adhesive material penetrating into and bonding with the one-piece woven fabric and an outer air impermeable and leak-resistant material bonded to the inner adhesive material.

17. The method of claim 16, wherein the air impermeable material has a tensile strength within the range of 30 MPa-50 MPa.

18. The method of claim 16, wherein, after solidification of the initial outer surface, approximately one half of the initial outer surface is the adhesive and approximately another half of the initial outer surface is the air-impermeable material.

19. The method of claim 16, wherein the inner adhesive material is a thermoplastic material.

20. The method of claim 19, wherein the thermoplastic material is an ethylene copolymer.

21. The method of claim 16, wherein the air impermeable material is a thermoplastic polyurethane polymer.

22. The method of claim 21, wherein the thermoplastic polyurethane polymer has a molecular weight within a range of 100,000-200,000.

23. The method of claim 16, wherein the air impermeable material is polymeric and has an ultimate elongation percentage that is greater than 300%.

24. The method of claim 23, wherein the ultimate elongation percentage of the air impermeable material is in a range of 500%-700%.

25. The method of claim 1, wherein the preheating is performed by infrared heaters, and
wherein the initial outer surface of the one-piece woven fabric is preheated to a fabric temperature within a range of 100° C.-180° C.

26. The method of claim 25, wherein the coating machine comprises an elongated die, and
wherein at least one of the infrared heaters is 3 meters or less from the die and 0.3 meters per second of fabric speed from the die.

* * * * *